May 16, 1950   M. MORISUYE ET AL   2,508,184
BUSHING MOUNTING STRUCTURE
Filed Feb. 1, 1946

WITNESSES:
Edward Michaels

INVENTORS
Masanobu Morisuye &
Reino J. Niemela.
BY Franklin E. Hardy
ATTORNEY

Patented May 16, 1950

2,508,184

UNITED STATES PATENT OFFICE 2,508,184

BUSHING MOUNTING STRUCTURE

Masanobu Morisuye, Sharon, Pa., and Reino J. Niemela, Cleveland, Ohio, assignors to Westinghouse Electric Corporation, East Pittsburgh, Pa., a corporation of Pennsylvania Application February 1, 1946, Serial No. 644,805

4 Claims. (Cl. 174—31)

This invention relates to electrical apparatus and more particularly to the provision of porcelain bushings or outlets for electrical conductors from such apparatus that are semi-rigid and fluid and pressure tight.

In accordance with the invention, porcelain outlet bushings are mounted directly on a tank or container, or the cover thereof, enclosing electrical apparatus which may be a capacitor or gas-filled rotating machine, or a liquid immersed or gas filled transformer. In accordance with the invention, a mounting is used for the outlet bushing that is semi-rigid for mechanical strength and is provided with a solder seal for fluid and pressure tightness. In a structure formed in accordance with the invention, the mechanical supporting parts of the structure and the pressure sealing parts are separate so that the elements effecting the pressure seal are not required to carry the weight of the bushing, thus eliminating the mechanical load on the solder sealing member, and the difficulty of solder sealing the mounting parts that support the bushing is thus eliminated.

An object of the invention is the provision of an outlet for the leads from an electrical apparatus of the above-indicated character in which the solder sealing member is independent of the mounting parts, thereby making it possible to arrange the solder sealing member to suit particular applications without effecting the inherent mechanical strength of the bushing after its final mounting.

Figure 1:
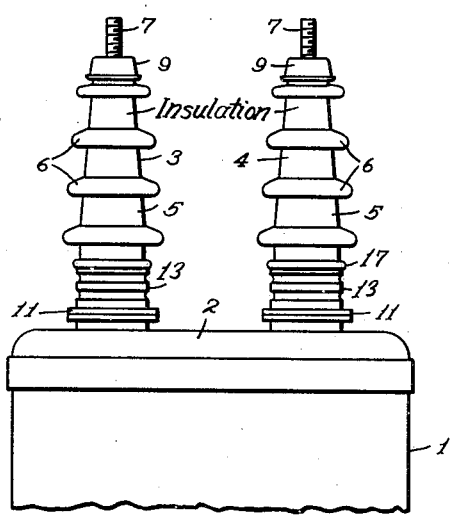
Figure 2:
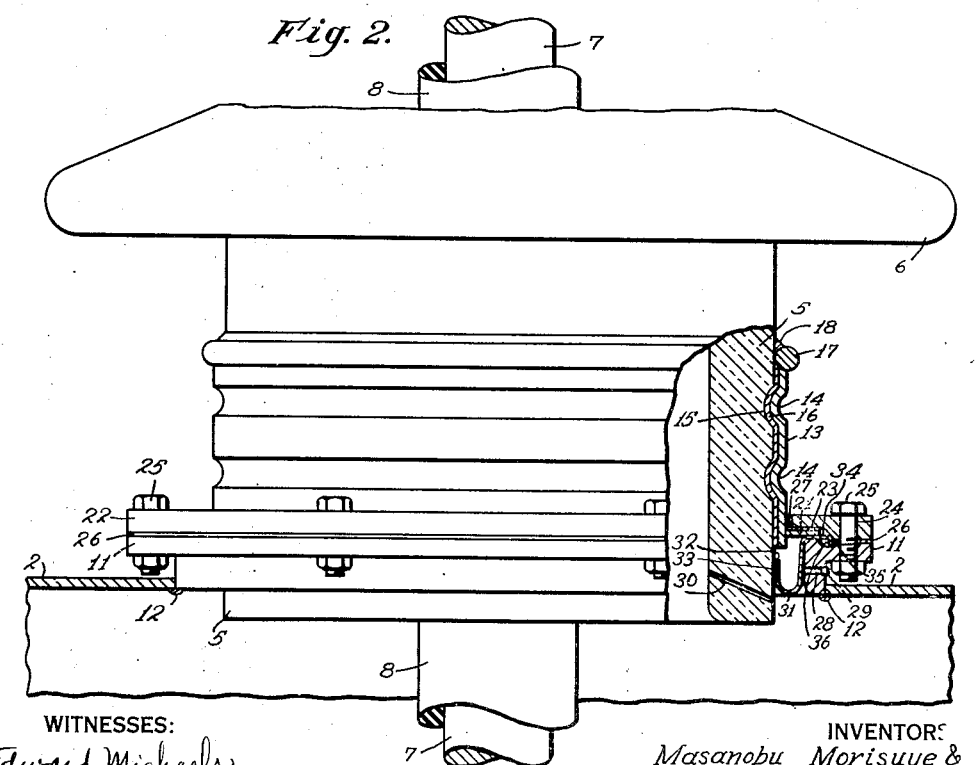

Other objects and advantages of the invention will be apparent from the following description of a preferred embodiment thereof, reference being made to the accompanying drawings, in which:

Fig. 1 is an elevational view of the upper portion of a tank or casing upon the cover of which is mounted bushings in accordance with the invention, and Fig. 2 is an enlarged view of the lower portion of a bushing as shown in Fig. 1, parts being shown in section.

Referring to the drawing and particularly to Fig. 1 thereof, a tank or casing 1 is illustrated having a cover 2, upon which are mounted two bushings 3 and 4, each comprising a tube 5 of dielectric material, such as porcelain or the like, having spaced annular creepage flanges 6 distributed along its outer side. Studs 7 of electrically conducting material extend centrally through the dielectric bushing tubes 5. These studs are provided to connect the electrical apparatus within the casing to the electrical circuit conductors exterior of the casing, and may extend through a tube 8 of insulating material, such as Micarta, crepe paper, or fiber tube, and are normally supported adjacent their ends by some suitable means, such as metal caps 9, those at the upper ends being shown in Fig. 1. Referring particularly to Fig. 2, a flange 11 is provided extending upwardly from the cover 2 of the casing, and extends outwardly to serve as a support for the bushing structure. The flange may be sealed to the casing cover, as shown at 12.

A metal sleeve 13 is illustrated for supporting the bushing 5. The sleeve is crimped or rolled at 14 so as to fit snugly within grooves 15 provided in the porcelain structure 5. Gaskets 16 may be positioned within the grooves to aid in tightly fitting the sleeve and porcelain structure together. An annular static ring 17 is provided at the upper end of the sleeve 13 and cement 18 is provided between the porcelain and the upper portion of the metal sleeve to prevent moisture or foreign matter from entering the space between the sleeve and the porcelain. An outwardly extending flange 21 is shown about the lower end of the sleeve 13 and is adapted to carry the weight of the bushing structure, the flange 21 resting against the inner portion of the supporting flange 11 extending upwardly from the casing cover. A clamping ring 22 is provided having an inner portion 23 thereof, adapted to set above the flange 21 on the lower end of the sleeve 13. Suitable openings 24 are provided in the clamping ring and a supporting flange to accommodate a series of bolts 25 for retaining the clamping ring snugly against the supporting flange 11. A suitable gasket 26 may be provided between the clamping ring 22 and the supporting flange 11. Likewise, a suitable gasket 27 may be provided between flange 21 extending outwardly from the sleeve and the clamping ring 22. An inspection vent 28 may be provided extending substantially horizontally through the vertical wall portion of the flange member 11, and normally having a removable plug 29 therein. Several slots or small passages 30 may be cut through the wall of the bushing near the lower end thereof at an angle such that the outer end is lower than the inner end thereof to provide an air or gas vent.

A solder sealing member 31 is provided, having its inner edge 32 extending along the lower surface of the porcelain structure 5, and soldered thereto as shown at 33 to form a tight joint between the member 31 and the porcelain. The solder sealing member 31 is formed to curve outwardly and extends upwardly along the inner surface of the mounting boss and extends outwardly as shown at 34 over the inner edge of the supporting flange 11, and beneath the flange 21, extending outwardly from the metal sleeve 13. The outer rim of the sealing member 31 extends downwardly at 35 into a groove 36 provided in the upper surface of the flange 11, and is solder sealed within it. Groove 36 thus forms a fluid and pressure tight seal between the porcelain 5 and the boss on flange 11 supporting the bushing structure.

It will be appreciated that with the structure disclosed, the solder sealing member is made independent of the supporting parts of the structure, thus making it unnecessary to solder seal the metal sleeve 13, for example, to the porcelain. Experience has shown that it is difficult in practice to properly support a metal flange to provide the desired characteristics from the standpoint of mechanical strength, and also to solder seal the bushing element and metal supporting element about it. In the illustrated structure the entire weight of the bushing is communicated through the metal sleeve 13 and the flange 21 extending outwardly therefrom to the supporting flange 11, which in turn is mechanically clamped to the supporting clamp. This arrangement of the supporting structure provides a cushioning effect between the porcelain and its supporting sleeve making it possible to withstand every shock where other rigid mounting structures failed. It also eliminates the necessity of solder sealing the supporting structure to prevent leakage, which sealing is effected as above explained by the member 31 which performs its sealing function without the necessity of carrying the weight of the bushing structure.

Modifications in the details of the structure illustrated and described will occur to one skilled in the art and we do not wish to be otherwise limited than by the scope of the appended claims.

We claim as our invention:

1. A bushing comprising, in combination, a tubular insulating structure, an electrical conductor extending through said insulating structure and supported thereby, means for supporting said tubular insulating structure including a bushing supported flange having an annular groove in the upper surface thereof, a clamping ring cooperating with the supporting flange and bolted thereto, a metal sleeve extending about the tubular insulating structure and attached thereto and provided with an outwardly extending flange at its lower end fitting between the supporting flange and the inner edge of the clamping ring, an annular flexible sealing member encircling the tubular insulating structure and having its inner rim hermetically sealed thereto and its outer rim extending between the outwardly extending flange of the metal sleeve and the bushing supporting flange and into the annular groove in the upper surface thereof, the outer rim of the sealing member being hermetically sealed to the bushing supporting flange.

2. An insulating bushing for electrical apparatus, comprising a casing having an external flange serving as a support for the bushing, a tubular insulating structure, an electrical conductor extending through the tubular insulating structure and supported thereon, a supporting structure for the bushing including means for supporting said tubular insulating structure on said flange comprising a metal sleeve extending about the tubular insulating structure and attached thereto and provided with an outwardly extending flange supported by the external flange of the casing, an annular flexible sealing member separate from the supporting structure hermetically sealed to the casing flange at its outer rim and hermetically sealed to the tubular insulating structure at its inner rim to form a fluid tight seal between the casing and the tubular insulating structure, and a clamping ring attached to the casing flange for holding the metal sleeve and tubular insulating structure tightly in position to be supported by said casing flange.

3. An insulating bushing for electrical apparatus, comprising a casing having an external flange serving as a support for the bushing, a tubular insulating structure, an electrical conductor extending through the tubular insulating structure and supported thereon, means for supporting said tubular insulating structure on said flange comprising a metal sleeve extending about the tubular insulating structure and attached thereto and provided with an outwardly extending flange supported by the external flange of the casing, an annular flexible sealing member encircling the tubular insulating structure and having its inner rim hermetically sealed thereto and its outer rim extending between the outwardly extending flange of the metal sleeve and the external flange of the casing and hermetically sealed to the casing flange, and a clamping ring attached to the casing flange for holding the metal sleeve and tubular insulating structure tightly in position to be supported by said casing flange.

4. An insulating bushing for electrical apparatus, comprising a casing having an external flange serving as a support for the bushing, a tubular insulating structure, an electrical conductor extending through the tubular insulating structure and supported thereon, means for supporting said tubular insulating structure on said flange comprising a metal sleeve extending about the tubular insulating structure, said tubular insulating structure having grooves therein extending about the structure, gaskets within the grooves, the metal sleeve having rolled in depressions within the grooves against the gaskets for securely attaching the sleeve to the tubular insulating structure, the metal sleeve being provided with an outwardly extending flange at its inner end supported by the external flange of the casing, an annular flexible sealing member encircling the tubular insulating structure and having its inner rim hermetically sealed thereto, and its outer rim extending between the outwardly extending flange of the metal sleeve and the external flange of the casing and hermetically sealed to the casing flange to form a fluid tight seal between the casing and the tubular insulating structure and a clamping ring attached to the casing flange and extending over the outwardly extending flange of said metal sleeve for holding the metal sleeve and tubular insulating structure tightly in position to be supported by said casing flange.

MASANOBU MORISUYE.
REINO J. NIEMELA.

REFERENCES CITED

The following references are of record in the file of this patent:

UNITED STATES PATENTS

| Number | Name | Date |
|---|---|---|
| 1,945,917 | Scarpa | Feb. 6, 1934 |
| 2,014,441 | Matthews | Sept. 17, 1935 |
| 2,125,089 | Skvortzoff | July 26, 1938 |
| 2,374,638 | Lee | Apr. 24, 1945 |

FOREIGN PATENTS

| Number | Country | Date |
|---|---|---|
| 678,650 | Germany | July 19, 1939 |